United States Patent Office 3,120,998
Patented Feb. 11, 1964

3,120,998
PURIFICATION OF BORON NITRIDE BY TREATMENT WITH CARBONACEOUS AGENTS
Robert A. Mercuri, Westlake, and Lawrence M. Litz, Lakewood, Ohio, assignors to Union Carbide Corporation, a corporation of New York
No Drawing. Filed Dec. 15, 1958, Ser. No. 780,213
7 Claims. (Cl. 23—191)

This invention relates to the production of boron nitride of high purity and refers more particularly to the production of boron nitride of low carbon and low oxygen content.

This application is a continuation-in-part of our U.S. application, Serial No. 701,952, filed December 11, 1957, which is now abandoned.

Boron nitride is a material of increasing interest to industry. Several processes for preparing it are known, and considerable effort is made toward providing improved processes for its production on a large scale. Perhaps the most important single disadvantage of existing processes for the production of boron nitride is the fact that the product does not have the desired purity and particularly is undesirably high in carbon and oxygen, impurities which deleteriously affect the properties of boron nitride. Both oxygen and carbon content in the product may be in the order of 10 to 15 percent by weight.

Carbon contamination presumably occurs because the boron nitride is produced by reactions involving organic materials. Such reactions include those between organic amines and boric acid and are usually conducted in atmospheres from which oxygen is excluded. However, some oxygen-containing impurities generally remain in the boron nitride so produced, such as boron oxide, and it is essential to reduce the oxygen content to a minimum if a high purity product is to be attained. Such oxygen containing compounds are deleterious to the physical properties of boron nitride at high temperatures in that they may lower its rupture strength and render it less useful as a refractory material. The oxides may also be attacked by molten metals to produce borate or oxide slags in the molten metal thus affecting the usefulness of the boron nitride as a crucible or structural material for molten metals.

The principal object of the invention is to provide a process for the production of boron nitride of high purity.

A more specific object of the invention is to provide a process for the production of boron nitride low in carbon and oxygen content.

Broadly stated, the invention by means of which these objects are achieved comprises a process in which a carbon and oxygen-containing, boron nitride-yielding material is subjected to the action of an atmosphere of gaseous ammonia at a temperature of at least about 500° C. In one embodiment of the invention a high carbon and high oxygen boron nitride already produced is purified with respect to carbon and oxygen by heating it in the presence of gaseous ammonia above the indicated temperature. In another embodiment of the invention boron nitride low in carbon and oxygen is produced by reaction between suitable organic materials and boric acid in an atmosphere of gaseous ammonia. The purity of the boron nitride produced by either embodiment may be further improved by employing in conjunction with the gaseous ammonia a carbon-containing gas, such as methane or other sources of carbon which will interact with the oxygen-containing impurities to remove them at the indicated temperatures.

Referring to the embodiment of the invention wherein high carbon and high oxygen boron nitride is purified, the impure material is placed in a suitable vessel, for example a non-carbonaceous container such as a silica crucible and heated in gaseous ammonia. For example, boron nitride which has been prepared by the thermal decomposition of melamine borate in a nitrogen atmosphere at a maximum temperature of about 950° C. contained 13.3 percent carbon and 12.2 percent oxygen. This material when heated in a quartz vessel in a flowing stream of ammonia gas for one and one half hours at 950° C. had its carbon content lowered to 0.54 percent and its oxygen content lowered to 2.7 percent.

In another specific instance of the practice of this embodiment of the invention, boron nitride prepared by the decomposition of ethylenediamine borate and which contained 2.1 percent carbon and 42.3 percent oxygen was treated. One sample of this material was heated in the temperature range 800° C. to 950° C. for four hours in ammonia gas. After this treatment, its carbon content had been reduced to 0.1 percent and its oxygen content to 3.5 percent. Another portion of the same material was heated in a vacuum to a temperature in the range 1300° C. to 1500° C. for three-quarters of an hour without effecting reduction in its carbon or oxygen content.

From the above examples, it is evident that heating high carbon and high oxygen boron nitride in ammonia is effective in reducing the carbon and oxygen content substantially.

In another embodiment of the invention low carbon and low oxygen boron nitride is produced directly by heating a mixture of an organic amine and boric acid (the term "boric acid" as used herein includes its anhydride) to reaction temperature in the presence of gaseous ammonia. Indicative of the improvement in purity of boron nitride produced in this embodiment of the invention is the following: When a mixture of melamine and boric acid in a molar ratio of one mole melamine to two moles of boric acid is heated to about 950° C. in a quartz vessel in a quartz tube through which nitrogen or ammonia is passed, boron nitride is produced. The boron nitride produced in the presence of nitrogen under these conditions is of relatively high carbon and high oxygen content, in some cases the carbon content being as high as 13 percent and the oxygen content 12 percent. Under identical conditions except that the reaction is conducted in the presence of gaseous ammonia, the carbon content of the product is generally well below 1 percent and carbon contents as low as 0.05 percent have been achieved. Similarly in the presence of ammonia the oxygen content is reduced to a range of 4 to 5 percent.

In the experimental work just described, the starting material, a mixture of melamine and boric acid, had been produced by mixing melamine and boric acid in aqueous solutions. The mixture, after drying, was placed in the apparatus described and heated rather slowly over a period of one to two hours until it was at a temperature of about 950° C. while the respective gas was passed through the tube at a flow of about four cubic feet per hour. Some reaction occurs at temperatures as low as 500° C., but optimum temperature is about 900° C. to 950° C. The material was held at about 950° C. for about two hours. Similarly, a mixture of dry powders of melamine and boric acid as the starting materials, which are heated through the same temperature range in a flow of gaseous ammonia, will result in boron nitride of essentially the same high purity and high yield.

In another specific instance of the practice of the invention, hexamethylenetetramine when heated at 950° C. with boric acid in a molar ratio of four moles of boric acid ($H_3BO_3$) to one mole of the hexamethylenetetramine produced boron nitride having a carbon content of 1.50 percent and an oxygen content of 13 percent when the reaction was conducted in the presence of gaseous ammonia. The yield, based on utilization of boric acid, was 86.5 percent. When the same reaction was conducted under the same conditions except in the presence of nitrogen, the carbon content of the product was 38.4 percent and the oxygen content was 34.2 percent and the yield was only 24 percent.

Similar results were obtained in the reaction of ethylenediamine and boric acid. When this reaction was conducted in a nitrogen atmosphere, the product contained 19.0 percent carbon, a high percentage of oxygen and the yield was 20 percent. When the same reaction was conducted under the same conditions except that an ammonia atmosphere was employed, the product contained 1.13 percent carbon, 8.8 percent oxygen and the yield was 97 percent.

Interestingly, when diphenylamine and boric acid were mixed in 1 to 1 molar ratio and heated in nitrogen, no boron nitride was produced. The same mixture heated at the same temperature (950° C.) in ammonia produced boron nitride containing only 0.62 percent carbon. The yield was 27 percent.

Thus, it will be seen that the invention provides boron nitride of low carbon and low oxygen content, whether the starting material be high carbon and high oxygen boron nitride or mixtures of organic amines and boric acid which upon heating to reaction temperature produce boron nitride.

In the course of the development of the processes described above, analysis of the evolving gases showed them to contain appreciable amounts of ammonium cyanide. Due to this it is believed that the carbon residue contained in the boron nitride is sufficiently active to react with the ammonia to form ammonium cyanide and hydrogen and thereby effect the reduction of the carbon content of the boron nitride. It has been further discovered that the reduction in oxygen content was due to the fact that any remaining residual carbon or the carbon contained in the ammonium cyanide that is formed will react with the oxygen containing impurities in the impure boron nitride to form carbon monoxide which will evolve, thereby reducing oxygen contamination, as well, to a minimum.

Further experimental tests have shown that the use of a carbon containing gas such as methane or other sources of carbon, which at the temperatures employed in the boron nitride production processes described above will interact with the oxygen containing impurities to remove them, either prior to or in conjunction with the ammonia treatment, will further improve the purity of the product.

Other gases such as ethane, butane, or propane may also be used in the practice of the invention and the preferred gas to be used is natural gas, a mixture of methane (80 percent and above), ethane, propane, butane (normal and iso), and pentane, for it is quite inexpensive and readily obtainable. A gaseous carbonaceous material is preferred for a gaseous molecule may enter pores and crevices many times smaller than those accessible to liquids or solids and therein react with substantially all the residual oxygen compounds.

An example of the embodiment of the invention wherein the carbonaceous containing gas and the additional ammonia are mixed is as follows:

Recrystallized melamine borate having a melamine-boric acid ratio of 1 to 2 was heated in ammonia to 600° C. at which time 0.5 cubic foot per hour of dried natural gas was added to the ammonia stream. The latter was maintained at a flow rate of 4 cubic feet per hour. With this mixed gas system the temperature was held at 600° C. for one half hour, raised to 950° C. over a one and one half hour period and then held at 950° C. for an additional two hours to permit the ammonia to remove any residual carbon in the system. The product at this point was a pure white, soft powder analyzing 42.8 percent boron; 55.6 percent nitrogen, 0.12 percent carbon, and 1.48 percent oxygen. In the practice of this embodiment the preferred concentration of methane is approximately in the range of 1 to 15 percent volume of the total gaseous atmosphere.

An example of the embodiment of the invention wherein additional ammonia is subsequently used to remove any remaining carbon is as follows:

Recrystallized melamine borate having a melamine-boric acid ratio of 1 to 2 was again heated in ammonia to 600° C. The temperature cycling was essentially the same as above but a dried natural gas flow of two cubic feet per hour was maintained throughout the four hour period. The product at this point was a soft dark gray powder containing 3.59 percent carbon, 4.41 percent oxygen, 39 percent boron and 53 percent nitrogen. Heating this material for another four hours at 950° C. in a 4 cubic feet per hour stream of ammonia was sufficient to reduce the carbon and oxygen content substantially so that the final analysis was 42.7 percent boron, 55.9 percent nitrogen, 0.19 percent carbon, and 1.21 percent oxygen.

In both these examples, products of the order of 98.5 weight percent boron nitride were obtained. This is an improvement even over the excellent purity obtained in experiments run under the same conditions outlined above except that no carbon containing gas was employed and only pure ammonia was fed through the systems, where boron plus nitrogen contents were of the order of 95 percent.

In the practice of the invention it is preferred that the reaction temperatures be maintained below 1,000° C. in order to keep crystal order and size to a minimum. Poor crystalline order and small size have generally been found to permit sintering at lower temperatures and to result in increased strength in bodies fabricated from the powdered boron nitride.

As used herein the term "low carbon content" refers to a carbon content not exceeding 2 percent. It is pointed out, however, that in the embodiment of the invention wherein previously produced boron nitride is treated, reduction in carbon content may be achieved even if the boron nitride being treated initially has a carbon content below 2 percent.

What is claimed is:

1. A process for the production of boron nitride of low carbon and low oxygen content from carbon and oxygen-containing, boron nitride-yielding materials which are chosen from the group consisting of boron nitride which contains as impurities therein relatively large amounts of carbon and oxygen, and mixtures of organic amines and boric acid which upon heating to a sufficient reaction temperature yield a boron nitride material which contains as impurities therein relatively large amounts of carbon and oxygen, which process comprises the step of subjecting such material to the action of gaseous ammonia at a temperature of at least about 500° C.

2. In the production of boron nitride by a process which comprises heating a mixture of an organic amine and boric acid to reaction temperature in an atmosphere from which oxygen is excluded, wherein the organic amine is the type organic amine which when mixed with boric acid and heated to a sufficient reaction temperature yields a boron nitride material which contains as impurities therein relatively large amounts of carbon and oxygen, the improvement which comprises conducting such reaction in an atmosphere of gaseous ammonia at a temperature of at least about 500° C. whereby boron nitride of low carbon content and low oxygen content is produced.

3. In the production of boron nitride by a process which comprises heating a mixture of an organic amine and boric acid to reaction temperature in an atmosphere from which oxygen is excluded, wherein the organic amine is the type organic amine which when mixed with boric acid and heated to a sufficient reaction temperature yields a boron nitride material which contains as impurities therein relatively large amounts of carbon and oxygen, the improvement which comprises conducting such reaction in an atmosphere of gaseous ammonia and natural gas at a temperature of at least 500° C. and subsequently subjecting the reaction product of such heating to more gaseous ammonia, whereby boron nitride of low carbon and low oxygen content is produced.

4. A process for the production of boron nitride of low carbon and low oxygen content from carbon and oxygen containing boron nitride yielding materials which are chosen from the group consisting of boron nitride which contains as impurities therein relatively large amounts of carbon and oxygen, and mixtures of organic amines and boric acid which upon heating to a sufficient reaction temperature yield a boron nitride material which contains as impurities therein relatively large amounts of carbon and oxygen, which process comprises the step of subjecting such material to the action of gaseous ammonia and a gaseous hydrocarbon which is chosen from the group consisting of natural gas, methane, ethane, propane and butane at a temperature of at least about 500° C.

5. A process as defined in claim 4 wherein said gaseous hydrocarbon is natural gas which is present in the range of from 1 to 15 percent by volume of the total gaseous atmosphere.

6. In the production of boron nitride by a process which comprises heating a mixture of an organic amine and boric acid to reaction temperature in an atmosphere from which oxygen is excluded, wherein the organic amine is the type organic amine which when mixed with boric acid and heated to a sufficient reaction temperature yields a boron nitride material which contains as impurities therein relatively large amounts of carbon and oxygen, the improvement which comprises conducting such reaction in an atmosphere of gaseous ammonia and a gaseous hydrocarbon chosen from the group consisting of natural gas, methane, ethane, propane and butane, said reaction being carried out at a temperature of at least about 500° C. whereby boron nitride of low carbon and low oxygen content is produced.

7. The production of boron nitride by the process of claim 6 wherein said gaseous hydrocarbon is natural gas which is present in the range of from 1 to 15 percent by volume of the total gaseous atmosphere.

References Cited in the file of this patent

UNITED STATES PATENTS

| | | |
|---|---|---|
| 2,808,314 | Taylor | Oct. 1, 1957 |
| 2,865,715 | Kamlet | Dec. 23, 1958 |
| 2,888,325 | Taylor | May 26, 1959 |

FOREIGN PATENTS

| | | |
|---|---|---|
| 483,201 | Great Britain | Apr. 13, 1938 |
| 777,000 | Great Britain | June 1, 1957 |
| 545,408 | Canada | Aug. 27, 1957 |

OTHER REFERENCES

Williams: "Cyanogen Compounds," 2nd edition, 1948, Edw. Arnold & Co., London, pages 35 and 36.

Philosophical Magazine of Journal of Science, 3rd series, vol. 23, 1843, pp. 71 and 72.